(12) United States Patent
Hattori et al.

(10) Patent No.: US 8,831,846 B2
(45) Date of Patent: Sep. 9, 2014

(54) CONTROLLER OF CONTINUOUSLY VARIABLE TRANSMISSION

(75) Inventors: Kunio Hattori, Toyota (JP); Shinya Toyoda, Nissin (JP); Taira Iraha, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 208 days.

(21) Appl. No.: 13/575,532

(22) PCT Filed: Feb. 26, 2010

(86) PCT No.: PCT/JP2010/053169
§ 371 (c)(1),
(2), (4) Date: Jul. 26, 2012

(87) PCT Pub. No.: WO2011/104884
PCT Pub. Date: Sep. 1, 2011

(65) Prior Publication Data
US 2012/0310498 A1    Dec. 6, 2012

(51) Int. Cl.
*G06F 7/00* (2006.01)
*G06F 17/00* (2006.01)
*G06F 19/00* (2011.01)
*F16H 61/662* (2006.01)

(52) U.S. Cl.
CPC .................. *F16H 61/66259* (2013.01)
USPC ................ 701/61; 701/51; 701/55; 701/56; 701/58; 701/60

(58) Field of Classification Search
CPC ..... B60W 10/06; B60W 20/00; B60W 10/08; B60W 10/02; B60W 10/115; B60W 2540/10; B60W 2520/10; B60W 10/10; B60W 2710/0666; B60W 10/101; B60W 30/19; B60W 2510/1005; B60W 2710/1005; Y02T 10/6286; Y02T 10/6239; Y02T 10/6221; Y02T 10/642; Y02T 10/7258; Y02T 10/56; Y02T 10/84; B60K 6/48; B60K 1/02; B60K 6/547; B60K 6/543; B60K 6/36; B60K 6/54; B60K 6/365; B60K 6/445; F16H 61/66259; F16H 61/66; F16H 3/728; F16H 37/086; F16H 2037/088; F16H 37/084; F16H 37/0846; F16H 2200/0047; F16H 2200/0043; F16H 15/50; F16H 37/021; F16H 37/0853; F16H 2061/6614; F16H 2037/023; F16H 57/0489; F16H 9/24; F16H 2061/6618; F16H 2037/104; F16H 2200/006; Y10S 903/918; Y10S 903/945; Y10S 903/946; Y10S 903/909; Y10S 903/917; B60L 2240/423; B60L 2240/421; F02D 2250/18; F02D 2400/12; F02D 41/023; F02D 41/0225; B62M 11/04; H02K 7/116

See application file for complete search history.

(56) References Cited

U.S. PATENT DOCUMENTS

| | | | |
|---|---|---|---|
| 6,135,915 | A | 10/2000 | Aoki et al. |
| 2002/0025881 | A1 | 2/2002 | Miyazaki et al. |
| 2007/0099754 | A1 | 5/2007 | Yamaguchi et al. |
| 2008/0146409 | A1 | 6/2008 | Yamaguchi et al. |

FOREIGN PATENT DOCUMENTS

| | | |
|---|---|---|
| JP | A-03-181659 | 8/1991 |
| JP | A-2000-018347 | 1/2000 |
| JP | A-2002-039352 | 2/2002 |
| JP | A-2007-120733 | 5/2007 |
| JP | A-2007-132419 | 5/2007 |
| JP | A-2008-151197 | 7/2008 |
| JP | A-2008-151198 | 7/2008 |

OTHER PUBLICATIONS

International Search Report issued in Application No. PCT/JP2010/053169; Dated Apr. 13, 2010 (With Translation).

*Primary Examiner* — Bhavesh V Amin
(74) *Attorney, Agent, or Firm* — Oliff PLC

(57) ABSTRACT

Disclosed is an electronic controller which calculates the variable amounts of the thrust in a primary pulley based on the thrusts of the pulleys, the lower limit thrust and the upper limit thrust in the steps of a target change gear ratio limit routine. The electronic controller calculates the limit transmission speeds based on the variable amounts in the steps, and calculates the guard values for limiting the target change gear ratio based on the limit transmission speeds in the steps. An electronic controller limits the target change gear ratio by the guard values thus calculated, and controls the thrusts of the pulleys by feedback control based on the size of discrepancy of the limited target change gear ratio and the current change gear ratio $\gamma$.

9 Claims, 7 Drawing Sheets

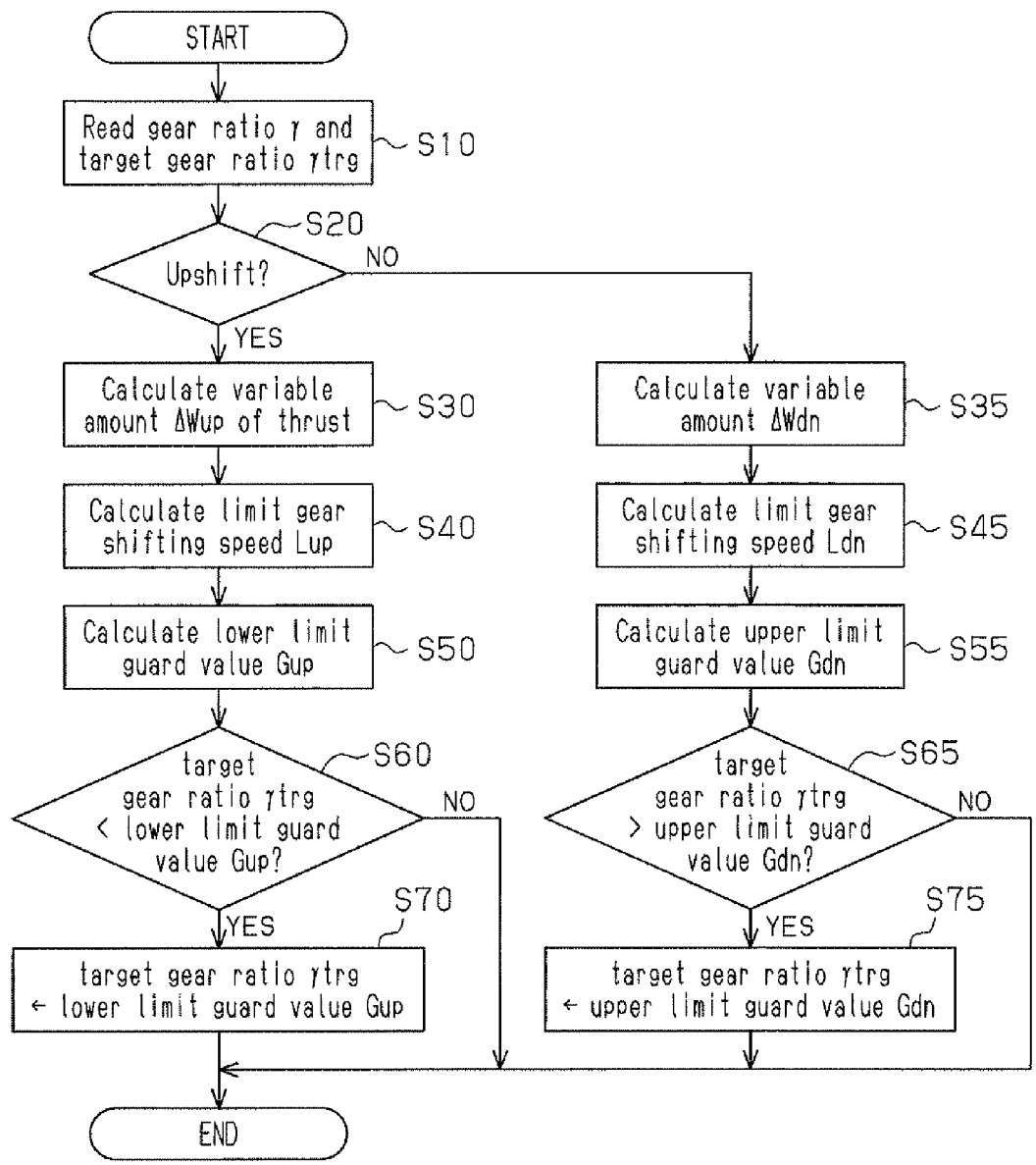

CONTROLLER OF CONTINUOUSLY VARIABLE TRANSMISSION

FIELD OF THE DISCLOSURE

The invention relates to a controller of a continuously variable transmission capable of changing a gear ratio by changing the winding radii of a belt wound around two pulleys, and more particularly, to a controller of a continuously variable transmission that controls thrust in the pulleys through feedback control.

BACKGROUND OF THE DISCLOSURE

As a continuously variable transmission provided in a vehicle, a belt type continuously variable transmission is known. The belt type continuously variable transmission includes a primary pulley to which a driving force of an internal combustion engine is transmitted, a secondary pulley connected to the vehicle wheels, and a belt wound around the two pulleys. The transmission changes a gear ratio continuously in a stepless manner by changing the winding radii of the belt at the pulleys.

In such a belt type continuously variable transmission, the winding radii of the belt at the pulleys are changed by changing hydraulic pressures in hydraulic chambers provided in the pulleys to change thrusts that are forces of the pulleys holding the belt in between, thereby controlling the gear ratio.

More specifically, to reduce the gear ratio, hydraulic pressure in the hydraulic chamber of the primary pulley is increased to increase thrust of the primary pulley, and hydraulic pressure in the hydraulic chamber of the secondary pulley is decreased to reduce thrust of the secondary pulley. This increases the winding radius of the belt at the primary pulley and decreases the winding radius of the belt at the secondary pulley thereby reducing the gear ratio.

To increase the gear ratio, on the other hand, the hydraulic pressure in the hydraulic chamber of the primary pulley is decreased to reduce the thrust of the primary pulley, and the hydraulic pressure in the hydraulic chamber of the secondary pulley is increased to increase the thrust of the secondary pulley. This decreases the winding radius of the belt at the primary pulley and increases the winding radius of the belt at the secondary pulley thereby increasing the gear ratio.

In patent document 1, a controller of a continuously variable transmission is described. In a transient state in which a gear ratio is being changed so that the gear ratio approaches a target gear ratio, the controller calculates the gear shifting speed required for the current gear ratio to conform to the target gear ratio and supplies the hydraulic pressure required to achieve the calculated gear shifting speed to the primary pulley.

The controller of such a continuously variable transmission can execute feedback control based on the difference between the actual gear ratio and the target gear ratio. For example, a basic hydraulic pressure control amount is calculated based on the target gear ratio, an integral term is calculated based on an integral value of the amount of the difference between the current gear ratio and the target gear ratio, and the hydraulic pressure controlled amount is corrected by the integral term is output to control the thrust of the primary pulley.

When such a configuration for controlling the thrusts of the pulleys through the feedback control is employed, it is possible to realize control reflecting a change history of the actual gear ratio.

PRIOR ART DOCUMENT

Patent Document

Patent Document 1: Japanese Laid-Open Patent Publication No. 3-181659

SUMMARY OF THE INVENTION

Problem to be Solved by the Invention

When the thrust of the primary pulley is decreased to increase the gear ratio, if the thrust of the primary pulley is decreased too suddenly, the thrust of the primary pulley and the thrust of the secondary pulley become imbalanced, the tension applied to the belt becomes insufficient, and the belt may slip on the pulleys. When the thrust of the primary pulley is increased to reduce the gear ratio, if the thrust of the primary pulley is increased too suddenly, the thrust of the primary pulley and the thrust of the secondary pulley become imbalanced, the tension applied to the belt becomes excessively large, and the belt may break.

In this manner, there is a limit to the speed at which the thrust of the primary pulley is changed, or the gear shifting speed. Even if the gear shifting speed required for the gear ratio to conform to the target gear ratio is calculated, the thrust of the primary pulley cannot be controlled to realize the gear shifting speed in some cases.

There is the limit to the gear shifting speed that can actually be realized. Thus, for example, as shown in FIG. 10, when a sudden acceleration is required and a target gear ratio $\gamma trg$ shown by the dashed line is suddenly increased, a gear ratio $\gamma$ shown by the solid line may not be able to readily follow the change in the target gear ratio $\gamma trg$. As a result, a state in which there is a large difference between the gear ratio $\gamma$ shown by the solid line and the target gear ratio $\gamma trg$ shown by the dashed line may continue as shown in FIG. 10.

In this state, if feedback control based on the difference between the target gear ratio $\gamma trg$ and the actual gear ratio $\gamma$ is executed as described above, an integral term in the feedback control keeps increasing.

As a result, as shown by a portion surrounded by a broken line in FIG. 10, even though the actual gear ratio $\gamma$ approaches the target gear ratio $\gamma trg$, the gear ratio $\gamma$ keeps changing at the gear shifting speed based on the control amount corrected by the excessively large integral term. This may cause overshooting in which the gear ratio $\gamma$ exceeds the target gear ratio $\gamma trg$.

This problem also occurs when the target gear ratio $\gamma trg$ suddenly becomes small. In such a case, even though the actual gear ratio $\gamma$ approaches the target gear ratio $\gamma trg$, the gear ratio keeps changing at the gear shifting speed based on the control amount corrected by the excessively large integral term. This may cause undershooting in which the gear ratio $\gamma$ falls below the target gear ratio $\gamma trg$.

It is an object of the invention to provide a controller of a continuously variable transmission capable of preventing an integral term from excessively increasing by feedback control when a target gear ratio is suddenly changed and thereby suppress overshooting and undershooting of the gear ratio.

Means for Solving the Problem

To achieve the above object, a controller of a continuously variable transmission according to the present invention includes a variable amount calculating unit that calculates a variable amount of the thrusts of the pulleys based on the thrust of each pulley under the current gear ratio, a lower limit thrust required for maintaining the current gear ratio without slipping a belt, which is wound around the pulleys, on the pulleys, and an upper limit thrust set by taking into consideration the durability of the belt. A limit speed calculating unit calculates a limit gear shifting speed based on the variable amount calculated by the variable amount calculating unit. A guard value calculating unit calculates a guard value for limiting the target gear ratio based on the limit gear shifting speed calculated by the limit speed calculating unit. The thrust of each pulley is controlled through feedback control based on the difference between the target gear ratio, which is limited by the guard value calculated by the guard value calculating unit, and the current gear ratio.

In a belt type continuously variable transmission, the gear ratio is changed by changing the thrusts of each pulley. Thus, when changing the thrust the pulleys by a greater extent during a unit time, the gear ratio can be changed more readily. Thus, when the thrusts of the pulleys are changed by a greater extent, that is, when the variable amounts of the thrusts in the pulleys are greater, it can be estimated that a greater gear shifting speed can be realized. Accordingly, if the variable amounts of the thrusts in the pulleys are calculated, a limit gear shifting speed, which is a limit value of the gear shifting speed, can be calculated based on the calculated variable amounts.

If the limit gear shifting speed can be estimated, the change in the gear ratio can be estimated when the gear ratio is changed at the estimated limit gear shifting speed, and estimate a range of the gear ratio, which can be changed during a predetermined period from the current state, can be estimated based on the change of the estimated gear ratio.

In the controller of a continuously variable transmission according to the present invention, the variable amounts of the thrusts of the pulleys are calculated as described above, and the limit gear shifting speed is calculated based on the calculated variable amount. The guard value, which limits the target gear ratio, is calculated based on the calculated limit gear shifting speed, and feedback control is executed based on the difference between the target gear ratio, which is limited by the guard value, and the current gear ratio. Thus, the target gear ratio can be limited in accordance with a range of the gear ratio that can be realized when the gear ratio is changed from the current state at the calculated limit gear shifting speed.

By limiting the target gear ratio in this manner, the value of the target gear ratio can be brought closer to a value of the gear ratio that can actually be realized as compared with when feedback control is executed without a guard value. This decreases the difference between the actual gear ratio and the target gear ratio that may be produced when the target gear ratio is suddenly changed.

Accordingly, the controller of a continuously variable transmission according to the present invention prevents the value of the integral term, which is calculated through the feedback control, from excessively increasing, and suppresses overshooting and undershooting of the gear ratio that is caused by an excessively increased integral term.

In one mode of the invention, it is desirable that a variable amount of a thrust of the primary pulley be calculated as the variable amount of the thrust, and the limit gear shifting speed is calculated based on the calculated variable amount of the thrust of the primary pulley.

As a specific method for calculating the variable amount of the thrust of the primary pulley, it is desirable that the thrust of the primary pulley be calculated, under the assumption that the thrust of the secondary pulley is equal to the lower limit thrust while maintaining a ratio of the thrusts of the pulleys under the current gear ratio, based on the thrust of each pulley under the current gear ratio and the lower limit thrust, and that a difference between the upper limit thrust and the calculated thrust be calculated as a variable amount of the thrust of the primary pulley when the gear ratio is decreased.

When the gear ratio is decreased, the thrust of the secondary pulley is decreased to the lower limit thrust, and the thrust of the primary pulley is increased to the upper limit thrust. This maximizes the gear shifting speed while preventing the belt from slipping on the pulleys or being cut.

A state in which the thrust of the secondary pulley is equal to the lower limit thrust while maintaining the ratio of the thrusts of the pulleys is a state in which the variable amount of the thrust becomes maximal when the thrust of the primary pulley is increased from the current state to the upper limit thrust. That is, the variable amount calculated by the above-described method is a maximum value of the variable amount of the thrust when the thrust of the primary pulley is increased from the current state under a condition that the belt does not slip or the belt is not cut.

Thus, calculation of the limit gear shifting speed when the gear ratio is decreased based on the variable amount calculated by the above-described method allows for calculation of the maximum gear shifting speed, which can be estimated under the condition that the belt does not slip or the belt is not cut, as the limit gear shifting speed. Estimation of the minimum value of the gear ratio that can be realized when the gear ratio is changed at the limit gear shifting speed and calculation of this value as the guard value allows for the guard value to become less than the gear ratio that can actually be realized.

Accordingly, employment of the configuration of calculation of the variable amount when the gear ratio is decreased with the above-described method allows for the gear ratio to be decreased at the maximum gear shifting speed that can be realized without limiting the target gear ratio in an unnecessary manner, and the target gear ratio can be limited to a value close to the gear ratio that can be realized.

Further, in the same manner, as a specific method for calculating the variable amount of the thrust of the primary pulley, it is desirable that the thrust of the primary pulley be calculated, under the assumption that the thrust of the secondary pulley is equal to the upper limit thrust while maintaining a ratio of the thrusts of the pulleys under the current gear ratio, based on the thrust of each pulley under the current gear ratio and the upper limit thrust, and that a difference between the calculated thrust and the lower limit thrust be calculated as a variable amount of the thrust of the primary pulley when the gear ratio is increased.

When the gear ratio is increased, the thrust of the secondary pulley is increased to the upper limit thrust, and the thrust of the primary pulley is decreased to the lower limit thrust. This maximizes the gear shifting speed while preventing the belt from slipping or being cut.

A state in which the thrust of the secondary pulley is equal to the upper limit thrust while maintaining the ratio of the thrusts of the pulleys is a state in which the variable amount of the thrust becomes maximal when the thrust of the primary pulley is decreased from the current state to the lower limit thrust. That is, the variable amount calculated by the above-described method is a maximum value of the variable amount of the thrust when the thrust of the primary pulley is decreased from the current state under a condition that the belt does not slip or the belt is not cut.

Thus, calculation of the limit gear shifting speed when the gear ratio is increased based on the variable amount calculated by the above-described method allows for calculation of the maximum gear shifting speed, which can be estimated under the condition that the belt does not slip or the belt is not cut, as the limit gear shifting speed. Estimation of the maximum value of the gear ratio that can be realized when the gear ratio is changed at the limit gear shifting speed and calculation of this value as the guard value allows for the guard value to become greater than the gear ratio that can be realized.

Accordingly, employment of the configuration of calculation of the variable amount when the gear ratio is increased with the above-described method allows for the gear ratio to be increased at the maximum gear shifting speed that can be realized without limiting the target gear ratio in an unnecessary manner, and the target gear ratio can be limited to a value close to the gear ratio that can be realized.

Further, to limit the target gear ratio, it is desirable that a minimum gear ratio that can be realized when the gear ratio is decreased at a limit gear shifting speed, which is calculated by the limit speed calculating unit, be calculated as a lower limit guard value, and a maximum gear ratio that can be realized when the gear ratio is increased at a limit gear shifting speed, which is calculated by the limit speed calculating unit, be calculate as an upper limit guard value, and the target gear ratio be limited to a range greater than or equal to the lower limit guard value and less than or equal to the upper limit guard value.

To suppress increases in the operation load on the controller when computing the guard value, it is desirable a configuration be employed in which a determining unit determines whether to increase or decrease the gear ratio, and an unnecessary one of the upper limit guard value and the lower limit guard value is not computed based on the determination of the determining unit.

More specifically, when the determining unit determines to decrease the gear ratio, an operation for calculating the lower limit guard value is executed to limit the target gear ratio based on the calculated lower limit guard value, and an operation for calculating the upper limit guard value is not executed.

When decreasing the gear ratio, the target gear ratio is set to a value less than the current gear ratio. Thus, the target gear ratio is not limited by the upper limit guard value, which is greater than the current gear ratio. As a result, when decreasing the gear ratio, there is no need to calculate the upper limit guard value.

When the determining unit determines to decrease the gear ratio, an operation for calculating the upper limit guard value is not carried out. If this configuration is employed, execution of an unnecessary operation can be omitted, and the operation load on the controller can be decreased.

When the determining unit determines to increase the gear ratio, an operation for calculating the lower limit guard value is not executed, an operation for calculating the upper limit guard value is executed, and the target gear ratio is limited based on the calculated upper limit guard value.

When increasing the gear ratio, the target gear ratio is set to a value greater than the current gear ratio. Thus, the target gear ratio is not limited by the lower limit guard value, which is less than the current gear ratio. As a result, when increasing the gear ratio, there is no need to calculate the lower limit guard value.

When the determining unit determines to increase the gear ratio, an operation for calculating the lower limit guard value is not carried out. If this configuration is employed, execution of an unnecessary operation can be omitted, and an operation load of the controller can be decreased.

To reduce an operation load of the controller, it is especially desirable that when the determining unit determines to decrease the gear ratio, an operation for calculating the upper limit guard value is not executed, an operation for calculating the lower limit guard value is executed, and the target gear ratio is limited based on the calculated lower limit guard value. When the determining unit determines to increase the gear ratio, the operation for calculating the lower limit guard value is not executed, the operation for calculating the upper limit guard value is executed, and the target gear ratio is limited based on the calculated upper limit guard value.

The lower limit thrust is calculated based on a torque transmitted by the belt, a winding radius of the belt in the primary pulley, a friction coefficient between the primary pulley and the belt, and a gradient of a portion of the primary pulley that contacts the belt.

The upper limit thrust can be calculated by multiplying the lower limit thrust by a coefficient that is greater than "1.0". The coefficient may be set in accordance with the durability of the belt so that sufficient durability can be ensured within a range in which the belt is used in the continuously variable transmission.

BRIEF DESCRIPTION OF THE DRAWINGS

FIG. 3 is a flowchart showing a flow of a series of processes of a target gear ratio limiting routine according to the present embodiment;

DETAILED DESCRIPTION OF THE PREFERRED EMBODIMENTS

A controller of a continuously variable transmission according to one embodiment of the invention will now be described with reference to FIGS. 1 to 8. The controller is embodied in an electronic controller 300 that entirely controls a vehicle.

Figure 1:
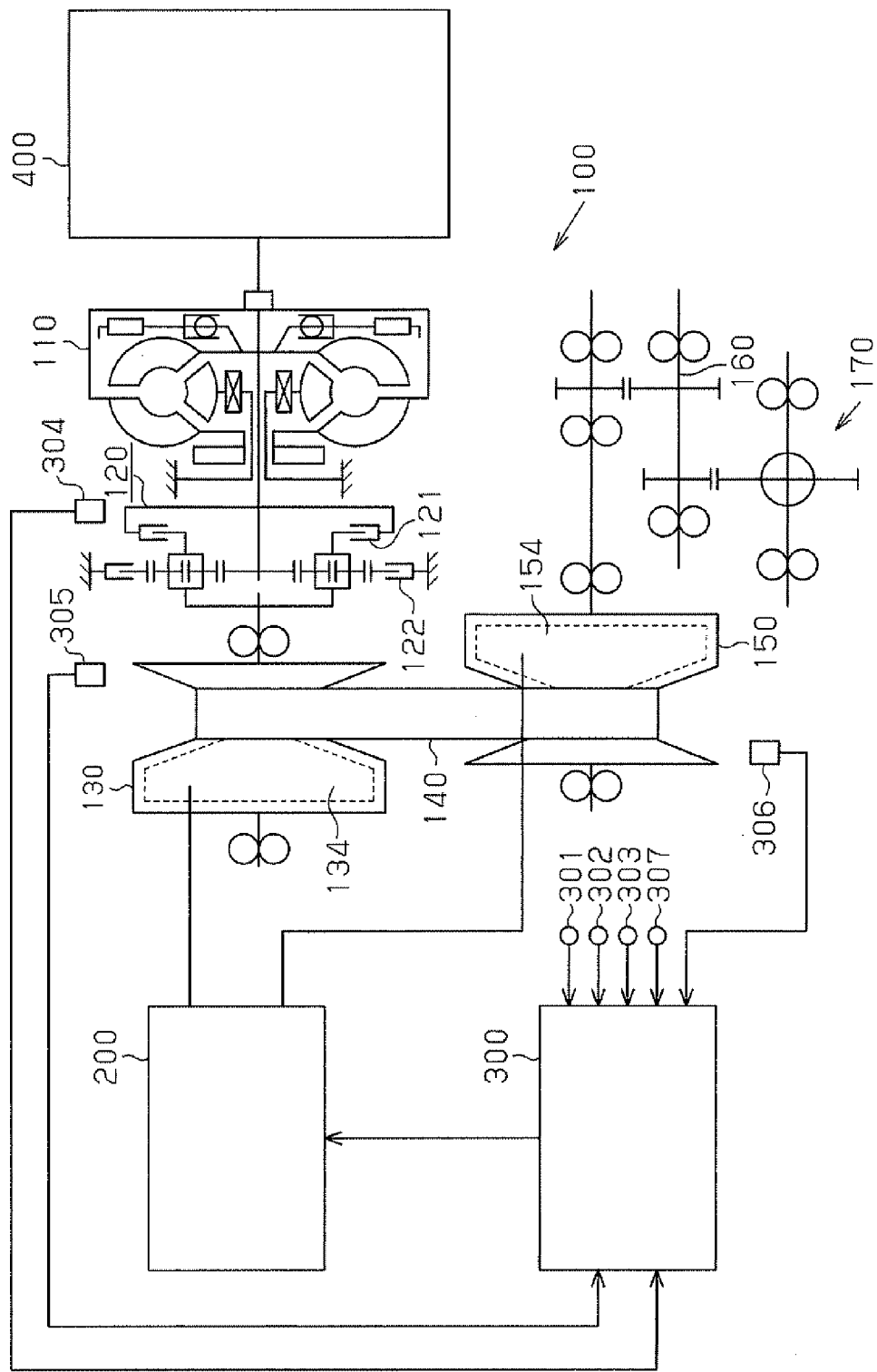
FIG. 1 is a schematic diagram of an electronic controller according to an embodiment and a continuously variable transmission controlled by the electronic controller.

FIG. 1 is a schematic block diagram of the electronic controller 300, which serves as a controller of a continuously variable transmission of the invention, and a continuously variable transmission 100, which is controlled by the electronic controller 300.

As shown in FIG. 1, an input shaft of a torque converter 110 in the continuously variable transmission 100 is connected to an output shaft of an internal combustion engine 400. An output shaft of the torque converter 110 is connected to an input shaft of a switching mechanism 120.

The switching mechanism 120 is a double-pinion planet gear mechanism and includes a forward clutch 121 and a reverse brake 122. An output shaft of the switching mechanism 120 is connected to a primary pulley 130.

When the forward clutch 121 is engaged and the reverse brake 122 is released, the driving force of the internal combustion engine 400, which is input through the torque converter 110, is directly transmitted to the primary pulley 130. In contrast, when the forward clutch 121 is released and the reverse brake 122 is engaged, the driving force of the internal combustion engine 400, which is input through the torque converter 110, is reversed and transmitted to the primary pulley 130 as a driving force of a reversed rotation.

According to this switching mechanism 120, if both the forward clutch 121 and the reverse brake 122 are released, the transmission of the driving force between the internal combustion engine 400 and the primary pulley 130 is cut off.

The primary pulley 130 is connected to a secondary pulley 150 by a belt 140. That is, the single belt 140 is wound around the primary pulley 130 and the secondary pulley 150, which are arranged in parallel to each other as shown in a central portion of FIG. 1. A driving force is transmitted between the primary pulley 130 and the secondary pulley 150 through the belt 140.

As shown in a lower right portion of FIG. 1, the secondary pulley 150 is connected to a differential 170 by a reduction gear 160. This transmits the rotation of the secondary pulley 150 to the differential 170 through the reduction gear 160. The driving force transmitted to the differential 170 is transmitted to left and right driving wheels through the differential 170.

Figure 2B:
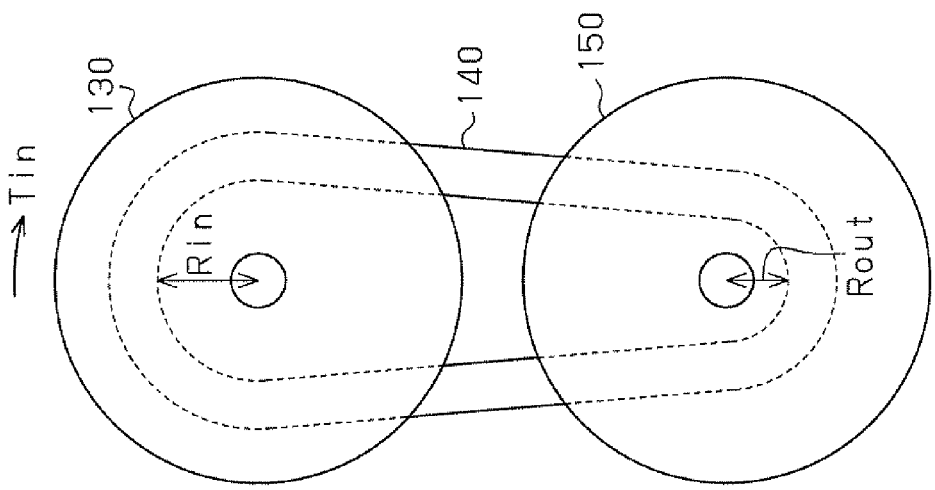
FIG. 2(b) is a side view of the pulleys of the continuously variable transmission.
Figure 2A:
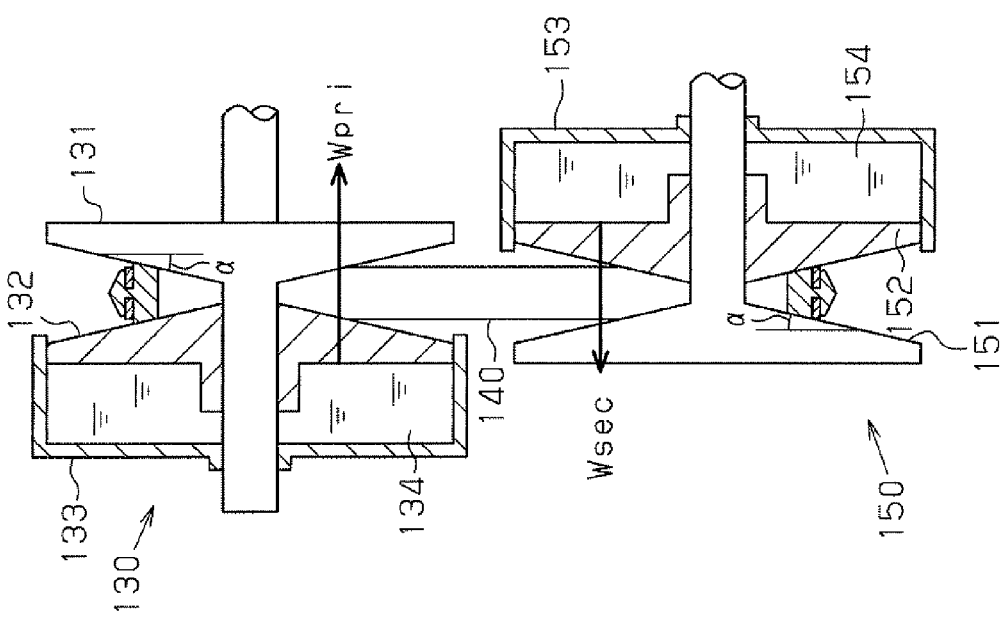
FIG. 2(a) is a cross-sectional view of pulleys of the continuously variable transmission.

As shown in an upper portion of FIG. 2(a), the primary pulley 130 includes a fixed sheave 131 and a movable sheave 132. The movable sheave 132 is incorporated in a housing 133 such that the movable sheave 132 is movable relative to the housing 133, and a hydraulic chamber 134 is defined and formed between the housing 133 and the movable sheave 132.

As shown in a lower portion of FIG. 2(a), the secondary pulley 150 also includes a fixed sheave 151 and a movable sheave 152. Like the primary pulley 130, the movable sheave 152 in the secondary pulley 150 is also incorporated in a housing 153 such that the movable sheave 152 is movable relative to the housing 153. According to this configuration, a hydraulic chamber 154 is also defined and formed between the housing 153 and the movable sheave 152 in the secondary pulley 150.

As shown in FIGS. 2(a) and 2(b), the belt 140 is wound around the primary pulley 130 and the secondary pulley 150. The belt 140 is held between the fixed sheave 131 and the movable sheave 132 in the primary pulley 130 and between the fixed sheave 151 and the movable sheave 152 in the secondary pulley 150.

Thus, the hydraulic pressure of the hydraulic chamber 134 in the primary pulley 130 is changed to change the distance between the fixed sheave 131 and the movable sheave 132 in the primary pulley 130. This changes the thrust Wpri, which is applied to the belt 140 in the primary pulley 130. Further, the hydraulic pressure of the hydraulic chamber 154 in the secondary pulley 150 is changed to change the distance between the fixed sheave 151 and the movable sheave 152 in the secondary pulley 150. This changes the thrust Wsec, which is applied to the belt 140 in the secondary pulley 150.

As shown in FIG. 2(a), portions of the sheaves 131, 132, 151 and 152 which come into contact with the belt 140 are provided with gradients. Hence, by changing the thrust Wpri in the primary pulley 130 and the thrust Wsec in the secondary pulley 150, the winding radii Rin and Rout of the belt 140 in the pulleys 130 and 150 are changed.

More specifically, by increasing the thrust Wpri in the primary pulley 130 and reducing the thrust Wsec in the secondary pulley 150, the winding radius Rin of the belt 140 in the primary pulley 130 is increased, and the winding radius Rout of the belt 140 in the secondary pulley 150 is decreased. On the other hand, by reducing the thrust Wpri in the primary pulley 130 and increasing the thrust Wsec in the secondary pulley 150, the winding radius Rin of the belt 140 in the primary pulley 130 is decreased, and the winding radius Rout of the belt 140 in the secondary pulley 150 is increased.

The continuously variable transmission 100 changes the thrusts Wpri and Wsec of the pulleys 130 and 150 and the winding radii Rin and Rout of the belt 140 at the pulleys 130 and 150 to control the gear ratio $\gamma$.

More specifically, when reducing the gear ratio $\gamma$, the hydraulic pressure in the hydraulic chamber 134 of the primary pulley 130 is increased, the thrust Wpri at the primary pulley 130 is increased, the hydraulic pressure in the hydraulic chamber 154 of the secondary pulley 150 is decreased, and the thrust Wsec at the secondary pulley 150 is decreased. This increases the winding radius Rin of the belt 140 at the primary pulley 130 and decreases the winding radius Rout of the belt 140 at the secondary pulley 150 thereby reducing the gear ratio $\gamma$.

On the other hand, when increasing the gear ratio $\gamma$, the hydraulic pressure in the hydraulic chamber 134 of the primary pulley 130 is decreased, the thrust Wpri in the primary pulley 130 is decreased, the hydraulic pressure in the hydraulic chamber 154 of the secondary pulley 150 is increased, and the thrust Wsec in the secondary pulley 150 is increased. This decreases the winding radius Rin of the belt 140 at the primary pulley 130 and increases the winding radius Rout of the belt 140 at the secondary pulley 150 thereby increasing the gear ratio $\gamma$.

As shown in FIG. 1, the hydraulic chambers 134 and 154 of the pulleys 130 and 150 are connected to a hydraulic pressure control unit 200. The hydraulic pressure control unit 200 is a hydraulic pressure circuit including a plurality of solenoid valves driven based on commands from the electronic controller 300. The hydraulic pressure control unit 200 adjusts the hydraulic pressure of hydraulic oil, supplies hydraulic oil to the hydraulic chambers 134 and 154, and discharges hydraulic oil from the hydraulic chambers 134 and 154 to adjust hydraulic pressures in the hydraulic chambers 134 and 154.

The electronic controller 300 includes a central processing unit (CPU), which executes an operation processes required for controlling the internal combustion engine 400 and operation processes required for controlling the continuously variable transmission 100 through the hydraulic pressure control unit 200. The electronic controller 300 further includes a read-only memory (ROM), which stores an operation program and an operation map for the operation processes and various data, and a random-access memory (RAM), which temporarily stores operation results.

As shown in FIG. 1, the sensors described below are connected to the electronic controller 300.

An accelerator position sensor 301 detects the amount of an accelerator pedal depressed by a driver. An air flow meter 302 detects the amount and temperature of the air drawn into the internal combustion engine 400. A crank angle sensor 303 detects the engine speed based on a rotation angle of a crankshaft, which is an output shaft of the internal combustion engine 400. A turbine rotation number sensor 304 is arranged in the vicinity of the switching mechanism 120 and detects the number of rotations of a turbine of the torque converter 110 per unit time. A primary pulley rotation number sensor 305 is arranged in the vicinity of the primary pulley 130 and detects the number of rotations Nin of the primary pulley 130 per unit time. A secondary pulley rotation number sensor 306 is arranged in the vicinity of the secondary pulley 150 and detects the number of rotations Nout of the secondary pulley 150 per unit time. Wheel speed sensors 307 are respectively arranged in the vicinity of the wheels and detect the number of rotations of the corresponding wheels per unit time.

Based on output signals from the various sensors 301 to 307, the electronic controller 300 entirely controls the internal combustion engine 400 and the continuously variable transmission 100. For example, a vehicle speed SPD is calculated based on the number of rotations Nout of the secondary pulley 150, which is detected by the secondary pulley rotation number sensor 306. A required torque is calculated based on the current vehicle speed SPD and the depression amount of the accelerator pedal detected by the accelerator position sensor 301. An opening degree of a throttle valve of the internal combustion engine 400 is adjusted to adjust the amount of air drawn into the internal combustion engine 400 and realize the required torque. The target gear ratio γtrg is calculated and gear control is executed to control the hydraulic pressure control unit 200 such that the gear ratio γ conforms to the target gear ratio γtrg.

In the gear control, the current gear ratio γ is calculated based on the number of rotations Nin of the primary pulley 130 and the number of rotations Nout of the secondary pulley 150, and the thrust Wpri in the primary pulley 130 is changed so that the gear ratio γ approaches the target gear ratio γtrg. The thrust Wpri in the primary pulley 130 is changed and the thrust Wsec in the secondary pulley 150 is changed so that the belt 140 does not slip on the pulleys 130 and 150. The thrusts Wpri and Wsec of the pulleys 130 and 150 can be calculated as a product of the hydraulic pressures of the hydraulic chambers 134 and 154 in the pulleys 130 and 150 and pressure receiving areas in the movable sheaves 132 and 152.

When the gear control is executed, the electronic controller 300 calculates the hydraulic pressure control amount required for the gear ratio γ to conform to the target gear ratio γtrg based on the difference between the current gear ratio γ and the target gear ratio γtrg, and the electronic controller 300 drives the hydraulic pressure control unit 200 based on the calculated hydraulic pressure control amount.

More specifically, the electronic controller 300 calculates a basic hydraulic pressure control amount based on the target gear ratio γtrg and calculates a proportional item based on the difference between the target gear ratio γtrg and the gear ratio γ as a first feedback correction item that is proportional to the difference. Further, the electronic controller 300 calculates an integral term based on a value obtained by integrating an amount of difference between the current gear ratio γ and the target gear ratio γtrg as a second feedback correction item and sends the hydraulic pressure control amount corrected by the proportional item and the integral term to the hydraulic pressure control unit 200.

When the thrust Wpri of the primary pulley 130 is decreased to raise the gear ratio γ and downshift, if the thrust Wpri of the primary pulley 130 is decreased too suddenly, the thrust Wpri in the primary pulley 130 and the thrust Wsec in the secondary pulley 150 become imbalanced and the tension applied to the belt 140 may become insufficient. Thus, the belt 140 may slip on the pulleys 130 and 150.

On the other hand, when the thrust Wpri of the primary pulley 130 is increased to reduce the gear ratio γ and shift to a higher gear, if the thrust Wpri of the primary pulley 130 is increased too suddenly increased, the thrust Wpri in the primary pulley 130 and the thrust Wsec in the secondary pulley 150 become imbalanced and the tension applied to the belt 140 may become excessively large. This may cut the belt 140.

In short, there is a limit to the speed at which the thrust Wpri of the primary pulley 130 is changed, namely, the gear shifting speed. Even if the gear ratio γ is changed so that the gear ratio γ conforms to the target gear ratio γtrg, the gear ratio γ may not readily conform to the target gear ratio γtrg (see FIG. 10). For example, when sudden acceleration is required and the target gear ratio γtrg shown by the dashed line suddenly increases, the gear ratio γ may not be able to readily follow the change in the target gear ratio γtrg.

If the gear ratio γ cannot readily follow the change of the target gear ratio γtrg, a state in which there is a large difference between the gear ratio γ and the target gear ratio γtrg may continue. In this manner, if a state in which there is a large difference between the gear ratio γ and the target gear ratio γtrg continues, the integral term in the feedback control keeps increasing. When the actual gear ratio γ approaches the target gear ratio γtrg, the gear ratio γ is changed at a large gear shifting speed based on the hydraulic pressure control amount corrected by the excessively large integral term. As a result, overshooting may occur in which the gear ratio γ increases and exceeds the target gear ratio γtrg.

Such a problem also occurs when the target gear ratio γtrg suddenly becomes small. In such a case, even though the actual gear ratio γ is approaching the target gear ratio γtrg, the gear ratio γ keeps changing at the gear shifting speed that is based on the hydraulic pressure control amount corrected by an excessively large integral term. Thus, undershooting may occur in which the gear ratio γ falls below the target gear ratio γtrg.

Hence, the electronic controller 300 of the present embodiment executes a target gear ratio limiting routine for limiting the value of the target gear ratio γtrg by a guard value when the gear control is executed.

The contents of the target gear ratio limiting routine will be described in detail with reference to FIG. 3. FIG. 3 is a flowchart showing a flow of a series of processes of the target gear ratio limiting routine. The target gear ratio limiting routine is repeatedly executed by the electronic controller 300 in predetermined control cycles during the gear control.

When the target gear ratio limiting routine starts, the electronic controller 300 first reads, in step S10, the current gear ratio γ and the target gear ratio γtrg calculated in the gear control.

The electronic controller 300 determines in step S20 whether or not the current gear shifting operation is an upshift. That is, in step S20, by determining whether or not the current gear shifting operation is an upshift, the electronic controller 300 determines whether the current gear shifting operation is an upshift to reduce the gear ratio γ or a downshifting to raise the gear ratio γ.

In step S20, when the target gear ratio γtrg is less than the current gear ratio γ, the electronic controller 300 determines that the current gear shifting operation is an upshift.

In step S20, if it is determined that the current gear shifting operation is an upshift (step S20: YES), the routine proceeds to step S30. In step S30, the electronic controller 300 calculates a variable amount ΔWup, which is required when the thrust Wpri upshifts the primary pulley 130 (see FIG. 4).

When the variable amount ΔWup is calculated, the electronic controller 300 first calculates a lower limit thrust Wmin which is the minimum thrust required to maintain the current gear ratio γ without slipping the belt 140.

The lower limit thrust Wmin is calculated in accordance with the following equation (1) based on an input torque Tin to the primary pulley 130, which is a torque transmitted through the belt 140, a winding radius Rin of the belt 140 at the primary pulley 130, a friction coefficient μ between the primary pulley 130 and the belt 140, and a gradient α of a portion of the primary pulley 130 with which the belt 140 comes into contact shown in FIG. 2(*a*).

$$W\text{min} = (T\text{in} \cdot \cos \alpha)/(2\mu \cdot R\text{in}) \qquad \text{Equation (1)}$$

When the lower limit thrust Wmin is calculated, the electronic controller 300 calculates an upper limit thrust Wmax by multiplying the calculated lower limit thrust Wmin by a coefficient, which is set based on the durability of the belt 140. The upper limit thrust Wmax is an upper limit value of a thrust set to prevent the belt 140 from being cut when the thrusts Wpri and Wsec of the pulleys 130 and 150 are changed. Thus, the coefficient by which the lower limit thrust Wmin is multiplied is set to a value greater than "1.0" in accordance with the durability of the belt 140 so that sufficient durability can be ensured within a range in which the belt 140 is used in the continuously variable transmission 100.

In the present embodiment, the upper limit thrust Wmax is calculated by multiplying the lower limit thrust Wmin by "1.5" as the coefficient.

Figure 4:
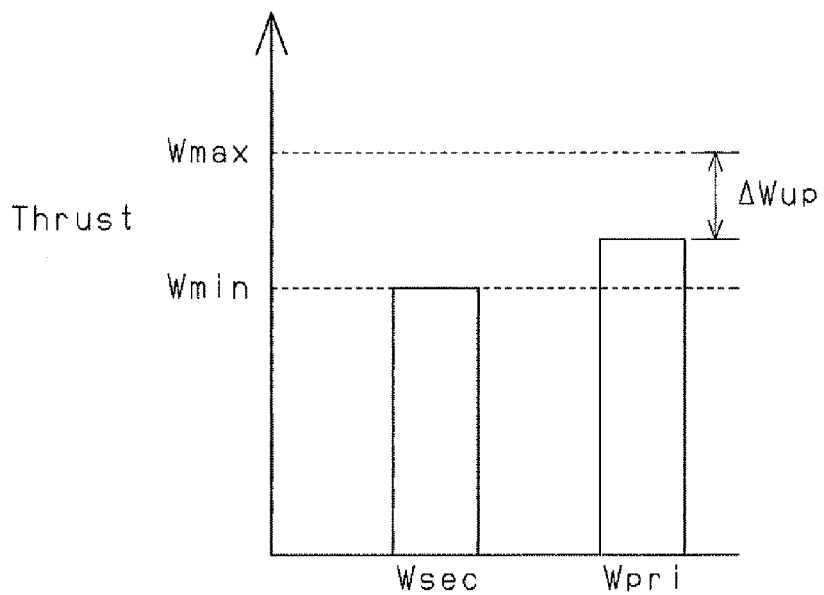
FIG. 4 is a graph for illustrating a calculation method of a variable amount of a thrust during upshifting.

If the lower limit thrust Wmin and the upper limit thrust Wmax are calculated in this manner, under the assumption that the thrust Wsec in the secondary pulley 150 is equal to the lower limit thrust Wmin while maintaining a ratio of the thrusts Wpri and Wsec of the pulleys 130 and 150 in the current gear ratio γ as shown in FIG. 4, the electronic controller 300 calculates the current thrust Wpri in the primary pulley 130.

As shown in FIG. 4, the difference between the upper limit thrust Wmax and the thrust Wpri in the primary pulley 130 is calculated and this value is set as the variable amount ΔWup.

In a belt type continuously variable transmission like the continuously variable transmission 100, the winding radii Rin and Rout are changed in accordance with a balance between the thrusts Wpri and Wsec of the pulleys 130 and 150, and the gear ratio γ is changed. Hence, the ratio of the thrusts Wpri and Wsec of the pulleys 130 and 150 becomes a specific value in accordance with the gear ratio γ.

That is, when the gear ratio γ becomes a certain value "γ1", the ratio of the thrusts Wpri and Wsec of the pulleys 130 and 150 becomes a ratio "R1" that corresponds to the gear ratio "γ1". When the gear ratio γ is changed to a certain value "γ2", the ratio of the thrusts Wpri and Wsec of the pulleys 130 and 150 becomes a ratio "R2" that corresponds to the gear ratio "γ2".

If the ratio of the thrusts Wpri and Wsec is not changed, the gear ratio γ is maintained even if both the thrusts Wpri and Wsec of the pulleys 130 and 150 become high, or even when both the thrusts Wpri and Wsec of the pulleys 130 and 150 become low.

When the variable amount ΔWup is calculated in the above-described manner, the routine proceeds to step S40. In step S40, the electronic controller 300 calculates a limit gear shifting speed Lup based on the variable amount ΔWup.

Figure 5:
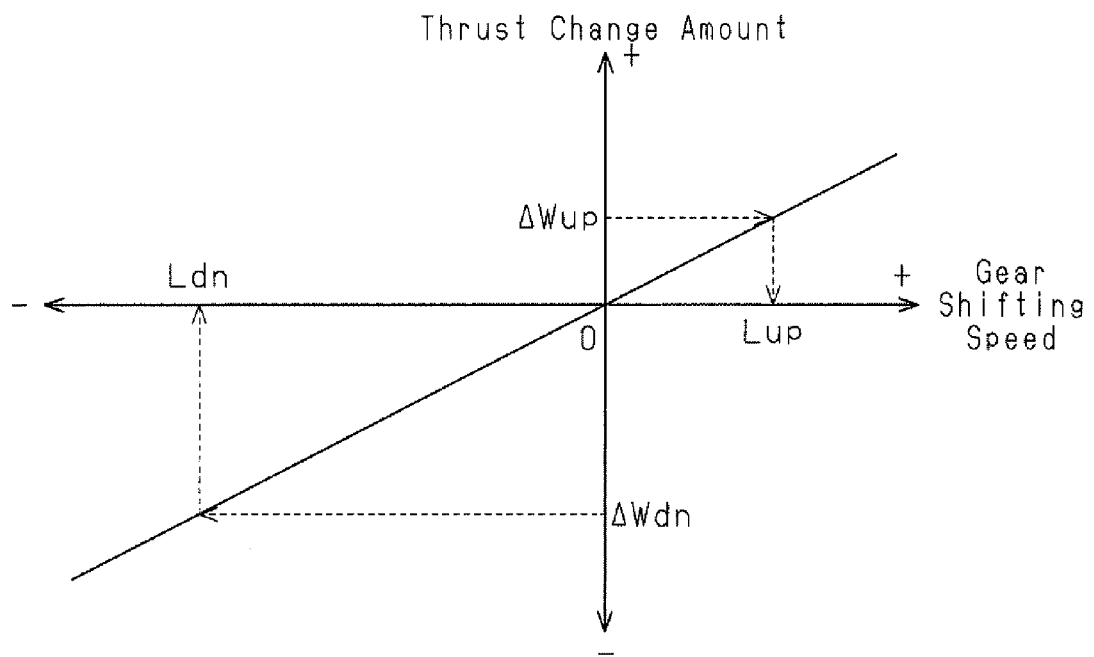
FIG. 5 is a graph showing the relation between a gear shifting speed and a change amount of the thrust.

Here, the limit gear shifting speed Lup is the maximum value of the gear shifting speed during upshifting is calculated using the relation between the gear shifting speed and a change amount of the thrust Wpri in the primary pulley 130 shown in FIG. 5. FIG. 5 is an operation map showing the relation between a gear shifting speed and a change amount of the thrust Wpri in the primary pulley 130. A straight line shown by a solid line in FIG. 5 is previously set in accordance with characteristics of the hydraulic pressure control unit 200 based on a result of a previously carried out experiment.

As shown by the arrow with a broken line in an upper right portion of FIG. 5, a gear shifting speed obtained when the thrust Wpri in the primary pulley 130 is increased by an amount corresponding to the variable amount ΔWup is calculated, and the calculated value is defined as a limit gear shifting speed Lup during upshifting.

When the limit gear shifting speed Lup is calculated in this manner, the routine proceeds to step S50. In step 50, the electronic controller 300 calculates a lower limit guard value Gup of the gear ratio γ based on the limit gear shifting speed Lup.

More specifically, when the current gear ratio γ is upshifted at the limit gear shifting speed Lup, a gear ratio γ that can be achieved until the next control cycle is estimated, and this value is calculated as the lower limit guard value Gup. That is, the minimum value of the gear ratio γ that can be realized when the current state is upshifted at the limit gear shifting speed Lup is calculated as the lower limit guard value Gup.

When the lower limit guard value Gup is calculated in this manner, the routine proceeds to step S60. In step S60, the electronic controller 300 determines whether or not the target gear ratio γtrg is less than the lower limit guard value Gup.

In step S60, when it is determined that the target gear ratio γtrg is less than the lower limit guard value Gup (step S60: YES), the routine proceeds to step S70. In step S70, the electronic controller 300 renews a value of the target gear ratio γtrg to a value equal to the lower limit guard value Gup, and the value equal to the lower limit guard value Gup is set as a new target gear ratio γtrg.

When the target gear ratio γtrg is renewed in this manner, the electronic controller 300 completes the target gear ratio limiting routine.

When it is not determined in step S60 that the target gear ratio γtrg is less than the lower limit guard value Gup (step S60: NO), that is, when it is determined that the target gear ratio γtrg is greater than or equal to the lower limit guard value Gup, the routine skips step S70. In this case, the electronic controller 300 does not change the target gear ratio γtrg and completes the target gear ratio limiting routine.

When it is determined in step S20 that the current gear shifting operation is not an upshifting (step S20: NO), that is, when it is determined that the current gear shifting operation is a downshift, the routine proceeds to step S35. In step S35, the electronic controller 300 calculates the variable amount ΔWdn required during downshifting for the thrust Wpri in the primary pulley 130 (see FIG. 6).

When calculating the variable amount ΔWdn, in the same manner as in step S30, the electronic controller 300 first calculates the lower limit thrust Wmin and the upper limit thrust Wmax. When the electronic controller 300 calculates the lower limit thrust Wmin and the upper limit thrust Wmax, under the assumption that the thrust Wsec in the secondary pulley 150 is equal to the upper limit thrust Wmax while maintaining the ratio of the thrusts Wpri and Wsec of the pulleys 130 and 150 in the current gear ratio γ as shown in FIG. 6, the electronic controller 300 calculates the current thrust Wpri in the primary pulley 130.

Figure 6:
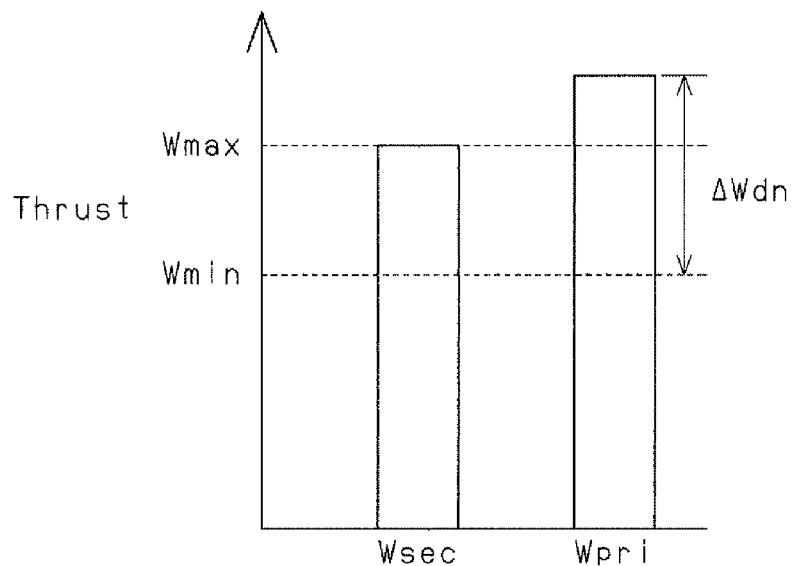
FIG. 6 is a graph for illustrating a calculation method of a variable amount of a thrust during downshifting.

Then, as shown in FIG. 6, the difference between the calculated thrust Wpri in the primary pulley 130 and the lower limit thrust Wmin is calculated, and this value is set as the variable amount ΔWdn.

When the variable amount ΔWdn is calculated in this manner, the routine proceeds to step S45. In step S45, the electronic controller 300 calculates a limit gear shifting speed Ldn based on the variable amount ΔWdn.

In the same manner as in step S40, the limit gear shifting speed Ldn, which is the maximum value of the gear shifting speed during downshifting, is calculated using the relation between the gear shifting speed and a change amount of the thrust Wpri in the primary pulley 130 shown in FIG. 5.

Here, as shown by the arrow with a broken line in a lower left portion of FIG. 5, a gear shifting speed obtained when the thrust Wpri in the primary pulley 130 is decreased by an amount corresponding to the variable amount ΔWdn is calculated, and this value is set as the limit gear shifting speed Ldn during downshifting.

If the limit gear shifting speed Ldn is calculated, the routine proceeds to step S55. In step S55, the electronic controller 300 calculates an upper limit guard value Gdn of the gear ratio γ based on the limit gear shifting speed Ldn.

More specifically, the electronic controller 300 estimates the gear ratio γ that can be achieved until the next control cycle when the current gear ratio γ is downshifted at the limit gear shifting speed Ldn, and the estimated value is calculated as the upper limit guard value Gdn. That is, the maximum value of the gear ratio γ that can be realized when the current state is downshifted at the limit gear shifting speed Ldn is calculated as the upper limit guard value Gdn.

When the upper limit guard value Gdn is calculated in this manner, the routine proceeds to step S65. In step S65, the electronic controller 300 determines whether or not the target gear ratio γtrg is greater than the upper limit guard value Gdn.

In step S65, if it is determined in step S65 that the target gear ratio γtrg is greater than the upper limit guard value Gdn (step S65: YES), the routine proceeds to step S75. In step S75, the electronic controller 300 renews the target gear ratio γtrg to a value equal to the upper limit guard value Gdn and sets the value equal to the upper limit guard value Gdn as a new target gear ratio γtrg.

When the target gear ratio γtrg is renewed, the electronic controller 300 completes the target gear ratio limiting routine.

If it is not determined in step S65 that the target gear ratio γtrg is greater than the upper limit guard value Gdn (step S65: NO), that is, if it is determined that the target gear ratio γtrg is less than or equal to the upper limit guard value Gdn, the routine skips step S75. In such a case, the electronic controller 300 does not change the target gear ratio γtrg and completes the target gear ratio limiting routine.

The target gear ratio limiting routine is executed and the target gear ratio γtrg is limited to a range greater than or equal to the lower limit guard value Gup and less than or equal to the upper limit guard value Gdn. Thus, even if it is required that the target gear ratio γtrg be suddenly changed, the difference between the target gear ratio γtrg and the gear ratio γ is small.

Figure 7:
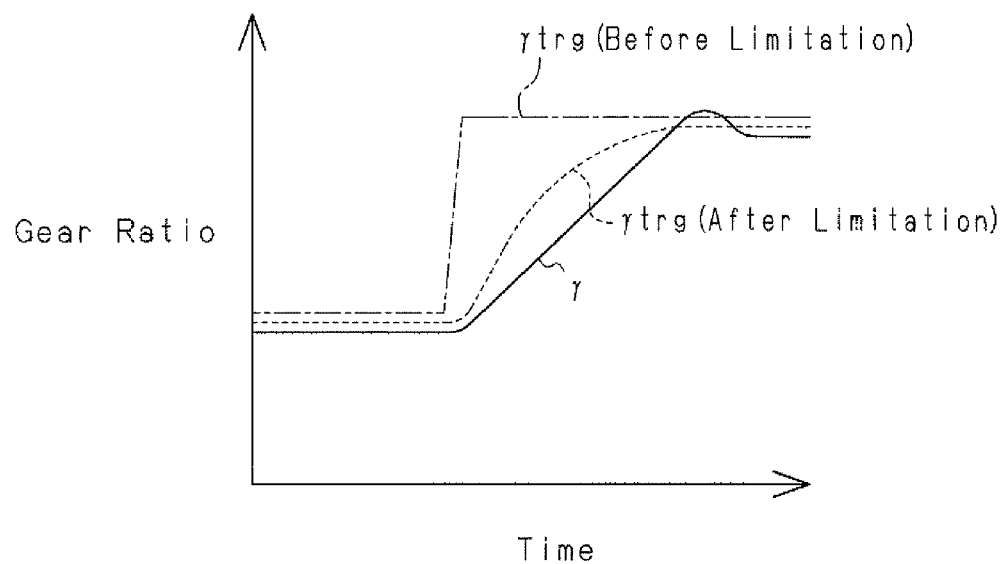
FIG. 7 is a time chart showing the relation between a change in a target gear ratio and a change of an actual gear ratio after the target gear ratio is limited when suddenly increased.
Figure 10:
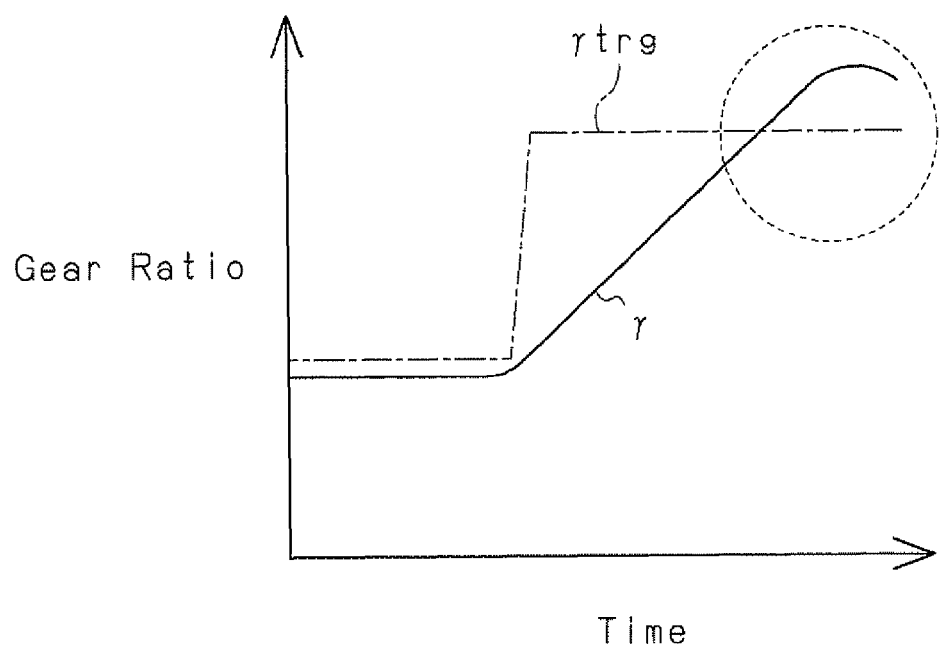
FIG. 10 is a time chart showing the relation between a change in a target gear ratio and a change in an actual gear ratio when sudden acceleration is required in a conventional controller of a continuously variable transmission.

For example, when a sudden acceleration is required, if it a sudden increase in the target gear ratio γtrg is required as shown by a dashed line in FIG. 7, the target gear ratio γtrg is limited by the upper limit guard value Gdn. Hence, as shown by the broken line, the target gear ratio γtrg that is limited becomes less than the target gear ratio γtrg before being limited as shown by the dashed line. According to this configuration, when the gear ratio γ is increased at the maximum gear shifting speed that can be currently realized as shown by a solid line in FIG. 7, the difference between the gear ratio γ and the target gear ratio γtrg after being limited becomes smaller than when the target gear ratio γtrg is not limited as shown in FIG. 10. Hence, the integral term calculated through the feedback control does not become excessively large, and overshooting of the gear ratio γ is suppressed as shown by the solid line in FIG. 7.

Figure 8:
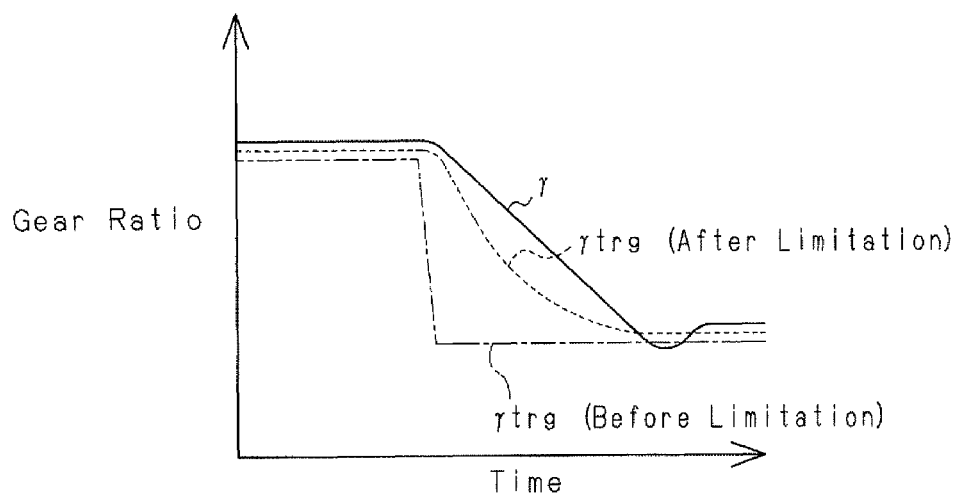
FIG. 8 is a time chart showing the relation between a change in the target gear ratio and a change of an actual gear ratio after the target gear ratio is limited when it is suddenly decreased.

When it is required that the target gear ratio γtrg be suddenly decreased as shown by a dashed line in FIG. 8, the target gear ratio γtrg is limited by the lower limit guard value Gup. The target gear ratio γtrg after being limited, as shown by the broken line, becomes greater than the target gear ratio γtrg before being limited, as shown by the dashed line. According to this configuration, when the gear ratio γ is decreased at the maximum gear shifting speed that can be currently realized as shown by a solid line in FIG. 8, the difference between the gear ratio γ and the target gear ratio γtrg after it is limited becomes smaller than when the target gear ratio γtrg is not limited. Hence, the integral term calculated through the feedback control does not become excessively large, and undershooting of the gear ratio γ is prevented as shown by the solid line in FIG. 8.

In the present embodiment, the process in step S20 of the target gear ratio limiting routine corresponds to a determining unit for determining whether the gear ratio γ should be increased or decreased, and step S30 and step S35 correspond to a variable amount calculating unit for respectively calculating variable amounts ΔWup and ΔWdn of the thrust Wpri in the primary pulley 130. Step S40 and step S45 correspond to a limit speed calculating unit for respectively calculating the limit gear shifting speeds Lup and Ldn, and step S50 and step S55 correspond to a guard value calculating unit for respectively calculating the guard values Gup and Gdn.

The above-described embodiment has the advantages described below.

(1) In the continuously variable transmission 100, the gear ratio γ is changed by changing the thrusts Wpri and Wsec in the pulleys 130 and 150. Hence, as the thrusts Wpri and Wsec in the pulleys 130 and 150 are changed to a larger degree during a unit time, the gear ratio γ can be readily changed. Thus, when the thrusts Wpri and Wsec of the pulleys 130 and 150 can be changed by a larger degree, that is, when the variable amounts of the thrusts Wpri and Wsec of the pulleys 130 and 150 are larger, it can be estimated that a greater gear shifting speed can be realized. Accordingly, by calculating the variable amounts of the thrusts Wpri and Wsec of the pulleys 130 and 150, a limit gear shifting speed, which is a limit value of the gear shifting speed, can be calculated.

If the limit gear shifting speed can be estimated, a change in the gear ratio γ when the gear ratio γ is changed at the estimated limit gear shifting speed can be estimated, and a range of the gear ratio γ that can be changed during a predetermined period from the current state based on the change of the estimated gear ratio γ can be estimated.

The electronic controller 300 calculates the variable amounts ΔWup and ΔWdn of the thrust Wpri at the primary pulley 130 based on the thrusts Wpri and Wsec of the pulleys 130 and 150 at the current gear ratio γ, the lower limit thrust Wmin, and the upper limit thrust Wmax during the target gear ratio limiting routine. Further, the electronic controller 300 calculates the limit gear shifting speeds Lup and Ldn based on the calculated variable amounts ΔWup and ΔWdn. The electronic controller 300 calculates the guard values Gup and Gdn, which limit the target gear ratio γtrg based on the calculated limit gear shifting speeds Lup and Ldn, and executes feedback control based on the difference between the current gear ratio γ and the target gear ratio γtrg limited by the guard values Gup and Gdn.

Thus, the target gear ratio γtrg can be limited in accordance with the range of the gear ratio γ that can be realized when the gear ratio γ is changed from the current state at the calculated limit gear shifting speeds Lup and Ldn.

Accordingly, if the target gear ratio limiting routine is executed, it is possible for the value of the target gear ratio γtrg to be brought closer to a value of the realizable gear ratio γ as compared with when the feedback control is executed without the guard values Gup and Gdn. Hence, it is possible to reduce the difference between the target gear ratio γtrg and the actual gear ratio γ that may be produced when the target gear ratio γtrg is suddenly changed.

That is, the value of the integral term calculated through the feedback control can be prevented from excessively increasing. Further, overshooting and undershooting of the gear ratio γ resulting from the excessively increased integral term can be suppressed.

(2) When reducing the gear ratio γ, the thrust Wsec in the secondary pulley 150 is decreased to the lower limit thrust Wmin and the thrust Wpri in the primary pulley 130 is increased to the upper limit thrust Wmax. This allows the gear shifting speed to be maximized while avoiding slipping and cutting of the belt 140.

A state in which the thrust Wsec in the secondary pulley 150 is equal to the lower limit thrust Wmin while maintaining the ratio of the thrusts Wpri and Wsec of the pulleys 130 and 150 is a state in which the variable amount of the thrust Wpri is maximal when the thrust Wpri in the primary pulley 130 is increased from the current state to the upper limit thrust Wmax. That is, the variable amount ΔWup calculated through step S30 in the target gear ratio limiting routine is a maximum value of the variable amount of the thrust Wpri in the primary pulley 130 when the thrust Wpri in the primary pulley 130 is increased from the current state under conditions that will not slip or cut the belt 140.

If the limit gear shifting speed Lup when the gear ratio γ is decreased based on the variable amount ΔWup is calculated as in the present embodiment, it is possible to calculate, as the limit gear shifting speed Lup, a maximum gear shifting speed that can be estimated under conditions that do not slip or cut the belt 140. If a minimum value of the gear ratio γ that can be realized when the gear ratio γ is changed at the limit gear shifting speed Lup is estimated and this value is calculated as the lower limit guard value Gup as in the present embodiment, the lower limit guard value Gup becomes less than the gear ratio γ that can actually be realized.

If the target gear ratio γtrg is limited through the target gear ratio limiting routine of the present embodiment, the gear ratio γ can be decreased at the maximum gear shifting speed that can be realized without limiting the target gear ratio γtrg in an unnecessary manner, and the target gear ratio γtrg can be limited to a value close to the gear ratio γ that can be realized.

(3) When increasing the gear ratio γ, the thrust Wsec in the secondary pulley 150 is increased to the upper limit thrust Wmax, the thrust Wpri in the primary pulley 130 is decreased to the lower limit thrust Wmin. This allows the gear shifting speed to be maximized while preventing the belt 140 from slipping or being cut.

A state in which the thrust Wsec in the secondary pulley 150 is equal to the upper limit thrust Wmax while maintaining the ratio of the thrusts Wpri and Wsec of the pulleys 130 and 150 is a state in which the variable amount of the thrust Wpri is maximal when the thrust Wpri in the primary pulley 130 is decreased from the current state to the lower limit thrust Wmin. That is, the variable amount ΔWdn calculated through step S35 in the target gear ratio limiting routine is a maximum value of the variable amount of the thrust Wpri in the primary pulley 130 when the thrust Wpri in the primary pulley 130 is decreased from the current state under conditions that will now slip or cut the belt 140.

If the limit gear shifting speed Ldn when the gear ratio γ is decreased based on the variable amount ΔWdn is calculated as in the present embodiment, it is possible to calculate, as the limit gear shifting speed Ldn, a maximum gear shifting speed that can be estimated under conditions that do not sip or cut the belt 140. If a maximum value of the gear ratio γ that can be realized when the gear ratio γ is changed at the limit gear shifting speed Ldn is estimated and this value is calculated as the upper limit guard value Gdn as in the present embodiment, the upper limit guard value Gdn becomes greater than the gear ratio γ that can actually be realized.

If the target gear ratio γtrg is limited through the target gear ratio limiting routine of the present embodiment, the gear ratio γ can be increased at the maximum gear shifting speed that can be realized without limiting the target gear ratio γtrg in an unnecessary manner, and the target gear ratio γtrg can be limited to a value close to the gear ratio γ that can be realized.

(4) When reducing the gear ratio γ, the target gear ratio γtrg is set to a value less than the current gear ratio γ. Thus, the target gear ratio γtrg is not limited by the upper limit guard value Gdn, which is greater than the current gear ratio γ. As a result, when reducing the gear ratio γ, there is no need to calculate the upper limit guard value Gdn.

In the present embodiment, when it is determined in step S20 of the target gear ratio limiting routine that the current gear shifting operation is an upshift (step S20: YES), operations (steps S35, S45 and S55) for calculating the upper limit guard value Gdn may be omitted. If this configuration is employed, execution of unnecessary operations can be omitted, and an operation load of the electronic controller 300 can be decreased.

(5) When increasing the gear ratio γ, the target gear ratio γtrg is set to a value greater than the current gear ratio γ. Thus, the target gear ratio γtrg is not limited by the lower limit guard value Gup, which is less than the current gear ratio γ. As a result, when increasing the gear ratio γ, there is not need to calculate the lower limit guard value Gup.

In the present embodiment, when it is determined in step S20 of the target gear ratio limiting routine that the current gear shifting operation is a downshift (step S20: NO), operations (steps S30, S40 and S50) for calculating the lower limit guard value Gup may be omitted. If this configuration is employed, execution of unnecessary operations can be omitted, and an operation load of the electronic controller 300 can be decreased.

The above embodiment can modified to the forms described below.

Although the current gear ratio γ is calculated based on the rotation speeds Nin and Nout of the pulleys 130 and 150 in the above embodiment, the calculation method of the gear ratio γ is not limited to this method. For example, it is possible to employ a configuration that includes sensors which respectively detects positions of the movable sheaves 132 and 152 in the pulleys 130 and 150 and calculates the current gear ratio γ based on the positions of the movable sheaves 132 and 152 detected by these sensors.

In the target gear ratio limiting routine of the present embodiment, it is determined in step S20 whether the current gear shifting operation is an upshift, and based on the result of determination, the lower limit guard value Gup or the upper limit guard value Gdn is calculated. Alternatively, the lower limit guard value Gup and the upper limit guard value Gdn may be calculated and then a target gear ratio limiting routine for determining whether the current gear shifting operation is an upshift may be executed as shown in FIG. 9.

Figure 9:
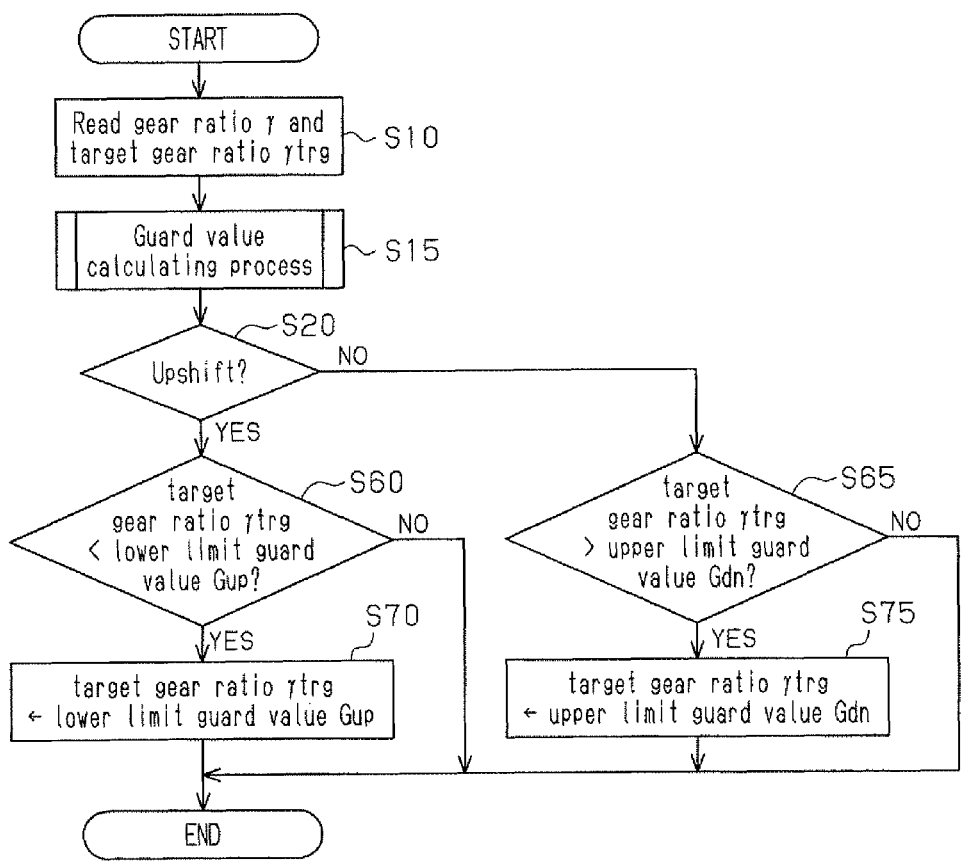
FIG. 9 is a flowchart showing a flow of a series of processes of a target gear ratio limiting routine according to a variation.

In this case, after the electronic controller 300 reads the gear ratio γ and the target gear ratio γtrg in step S10 as shown in FIG. 9, the electronic controller 300 executes the guard value calculating process in step S15. In this guard value calculating process, the electronic controller 300 calculates both the lower limit guard value Gup and the upper limit guard value Gdn with the same methods as steps S30, S40 and S50 as well as steps S35, S45 and S55 in the above embodiment.

Then, after the lower limit guard value Gup and the upper limit guard value Gdn are calculated, it is determined in step S20 whether the current gear shifting operation is an upshift, and if it is determined that the current gear shifting operation is an upshift (step S20: YES), the routine proceeds to step S60, and the target gear ratio γtrg is limited by the lower limit guard value Gup as in the above embodiment. If it is determined in step S20 that the current gear shifting operation is a downshift (step S20: NO), the routine proceeds to step S65, and the target gear ratio γtrg is limited by the upper limit guard value Gdn as in the above embodiment.

Regardless of whether the current gear shifting operation is an upshift or a downshift, even when employing the configuration that executes the target gear ratio limiting routine for constantly calculating the lower limit guard value Gup and the upper limit guard value Gdn, the same advantages as advantages (1) to (3) can be obtained.

When this configuration is employed, however, since unnecessary operations are also executed, an operation load of the electronic controller 300 is increased. Hence, to reduce the operation load of the electronic controller 300, it is desirable to employ a configuration that does not carry out operations for calculating the upper limit guard value Gdn when the current gear shifting operation is an upshift and does not carry out operations for calculating the lower limit guard value Gup when the current gear shifting operation is a downshift as in the above embodiment.

To reduce the operation load of the electronic controller 300 as much as possible, a configuration may be employed in which operations for calculating the upper limit guard value Gdn are not carried out when the current gear shifting operation is an upshift and operations for calculating the upper limit guard value Gdn and the lower limit guard value Gup are carried out when the current gear shifting operation is a downshift.

In the same manner, a configuration may be employed in which when the current gear shifting operation is an upshift, the upper limit guard value Gdn and the lower limit guard value Gup are calculated, and when the current gear shifting operation is a downshift, operations for calculating the lower limit guard value Gup are not carried out.

In the above embodiment, the variable amount ΔWup is calculated under the assumption that the thrust Wsec in the secondary pulley 150 is equal to the lower limit thrust Wmin. However, in the calculation method of the variable amount ΔWup, it is only necessary to calculate the variable amount ΔWup based on the thrusts Wpri and Wsec of the pulleys 130 and 150 in the current gear ratio γ and the lower limit thrust Wmin and the upper limit thrust Wmax, and the calculation method may be changed when necessary.

For example, the difference between the upper limit thrust Wmax and the current thrust Wpri in the primary pulley 130 may be calculated without assuming the above-described state, and the calculated value may be set as the variable amount ΔWup. If this configuration is employed, the variable amount ΔWup becomes less than the variable amount ΔWup in the present embodiment. Thus, the lower limit guard value Gup becomes a value closer to the current gear ratio γ than the lower limit guard value Gup in the above embodiment.

Accordingly, even when this configuration is employed, the difference between the target gear ratio γtrg and the actual gear ratio γ may be decreased. However, if this configuration is employed, the target gear ratio γtrg after being limited becomes excessively small, the gear shifting speed is limited more than the gear shifting speed that can actually be realized, and the time required for completing the gear shifting may become long.

In the above embodiment, the variable amount ΔWdn is calculated under the assumption that the thrust Wsec in the secondary pulley 150 is equal to the upper limit thrust Wmax. However, in the calculation method of the variable amount ΔWdn, it is only necessary to calculate the variable amount ΔWdn based on the thrusts Wpri and Wsec of the pulleys 130 and 150 in the current gear ratio γ and the lower limit thrust Wmin and the upper limit thrust Wmax, and the calculation method may be changed when necessary.

For example, the difference between the lower limit thrust Wmin and the thrust Wpri in the current primary pulley 130 may be calculated without assuming the above-described state, and the calculated value may be set as the variable amount ΔWdn. If this configuration is employed, the variable amount ΔWdn becomes less than the variable amount ΔWdn of the present embodiment. Thus, the upper limit guard value Gdn becomes a value closer to the current gear ratio γ than the upper limit guard value Gdn in the above embodiment.

Accordingly, even when this configuration is employed, the difference between the target gear ratio γtrg and the actual gear ratio γ may be decreased. However, if this configuration is employed, the target gear ratio γtrg after being limited becomes excessively large, the gear shifting speed is limited more than the gear shifting speed that can actually be realized, and the time required for completing the gear shifting may become long.

The above embodiment illustrates an example of a gear control in which the gear ratio γ is changed by changing the thrust Wpri in the primary pulley 130, and slipping of the belt 140 is suppressed by changing the thrust Wsec in the secondary pulley 150 in accordance with a change of the thrust Wpri in the primary pulley 130. However, the invention is not applied in a limited to a configuration that executes such a gear control.

For example, in contrast to the present embodiment, the present invention may be applied to a controller of a continuously variable transmission that executes gear control for preventing the belt 140 from slipping by changing the thrust Wsec in the secondary pulley 150 to change the gear ratio γ and by changing the thrust Wpri in the primary pulley 130 in accordance with a change of the thrust Wsec in the secondary pulley 150. In this case, portions corresponding to the primary pulley 130 of the processes in the above embodiment can be replaced by the secondary pulley 150, and portions corresponding to the secondary pulley 150 of the processes in the above embodiment can be replaced by the primary pulley 130.

Although the thrusts Wpri and Wsec in the pulleys 130 and 150 are controlled by controlling the hydraulic pressures in the hydraulic chambers 134 and 154 of the pulleys 130 and 150 in the present embodiment, the invention is not limited to the controller that controls the thrusts Wpri and Wsec of the pulleys 130 and 150 with hydraulic pressure. That is, if the controller controls the gear ratio γ by changing the thrusts Wpri and Wsec of the pulleys 130 and 150, even if a controller controls the thrusts Wpri and Wsec without executing hydraulic pressure control, the invention can be applied to the controller.

The control mode of the gear ratio γ in the present embodiment is one example of a control mode of the gear ratio γ, and the control manner can be changed as required. That is, the invention prevents the integral term calculated through feedback control from becoming excessively large when it is required to suddenly change the target gear ratio γtrg. Thus, the present invention can be applied as long as the gear ratio γ is controlled through feedback control.

DESCRIPTION OF REFERENCE CHARACTERS 100) continuously variable transmission, 110) torque converter, 120) switching mechanism, 121) forward clutch, 122) reverse brake, 130) primary pulley, 131) fixed sheave, 132) movable sheave, 133) housing, 134) hydraulic chamber, 140) belt, 150) secondary pulley, 151) fixed sheave, 152) movable sheave, 153) housing, 154) hydraulic chamber, 160) reduction gear, 170) differential, 200) hydraulic pressure control unit, 300) electronic controller, 301) accelerator position sensor, 302) air flow meter, 303) crank angle sensor, 304) turbine rotation number sensor, 305) primary pulley rotation number sensor, 306) secondary pulley rotation number sensor, 307) wheel speed sensor

The invention claimed is:

1. A controller of a continuously variable transmission that controls thrusts of a primary pulley and a secondary pulley through feedback control based on a difference between a target gear ratio and a current gear ratio, wherein the controller controls a gear shifting speed that is a changing speed of a gear ratio, the controller comprising:
   a variable amount calculating unit that calculates the thrust of the primary pulley, under the assumption that the thrust of the secondary pulley is equal to an upper limit thrust set by taking into consideration the durability of a belt while maintaining a ratio of the thrusts of the pulleys under the current gear ratio, based on the thrust of each pulley under the current gear ratio and the upper limit thrust, and the variable amount calculating unit calculates a difference between the calculated thrust and a lower limit thrust, which is required to maintain the current gear ratio without the belt slipping on the pulleys that the belt is wound around, as a variable amount of the thrust of the primary pulley;
   a limit speed calculating unit that calculates a limit gear shifting speed, which is a limit value of the gear shifting speed, based on the variable amount of the thrust of the primary pulley calculated by the variable amount calculating unit; and
   a guard value calculating unit that calculates a guard value for limiting the target gear ratio based on the limit gear shifting speed calculated by the limit speed calculating unit;
   wherein the thrust of each pulley is controlled through feedback control based on the difference between the target gear ratio, which is limited by the guard value calculated by the guard value calculating unit, and the current gear ratio.

2. A controller of a continuously variable transmission that controls thrusts of a primary pulley and a secondary pulley through feedback control based on a difference between a target gear ratio and a current gear ratio, wherein the controller controls a gear shifting speed that is a changing speed of a gear ratio, the controller comprising:
   a variable amount calculating unit that calculates the thrust of the primary pulley, under the assumption that the thrust of the secondary pulley is equal to a lower limit thrust, which is required to maintain the current gear ratio without a belt slipping on the pulleys that the belt is wound around, while maintaining a ratio of the thrusts of the pulleys under the current gear ratio, based on the thrust of each pulley under the current gear ratio and the lower limit thrust, and the variable amount calculating unit calculates a difference between the calculated thrust and an upper limit thrust, which is set by taking into consideration the durability of the belt, as a variable amount of the thrust of the primary pulley;
   a limit speed calculating unit that calculates a limit gear shifting speed, which is a limit value of the gear shifting speed, based on the variable amount of the thrust of the primary pulley calculated by the variable amount calculating unit; and
   a guard value calculating unit that calculates a guard value for limiting the target gear ratio based on the limit gear shifting speed calculated by the limit speed calculating unit;
   wherein the thrust of each pulley is controlled through feedback control based on the difference between the target gear ratio, which is limited by the guard value calculated by the guard value calculating unit, and the current gear ratio.

3. The controller of a continuously variable transmission according to claim 1, wherein the variable amount calculating unit calculates the thrust of the primary pulley, under the assumption that the thrust of the secondary pulley is equal to the lower limit thrust while maintaining a ratio of the thrusts of the pulleys under the current gear ratio, based on the thrust of each pulley under the current gear ratio and the lower limit thrust, and the variable amount calculating unit calculates a difference between the upper limit thrust and the calculated thrust as a variable amount of the thrust of the primary pulley when the gear ratio is decreased.

4. The controller of a continuously variable transmission according to claim 1, wherein
   the guard value calculating unit calculates, as a lower limit guard value, a minimum gear ratio that can be realized when the gear ratio is decreased at a limit gear shifting speed calculated by the limit speed calculating unit, and the guard value calculating unit calculates, as an upper limit guard value, a maximum gear ratio that can be realized when the gear ratio is increased at a limit gear shifting speed calculated by the limit speed calculating unit, and
   the target gear ratio is limited to a range greater than or equal to the lower limit guard value and less than or equal to the upper limit guard value.

5. The controller of a continuously variable transmission according to claim 4, further comprising
   a determining unit that determines whether to decrease or increase the gear ratio, and
   when the determining unit determines to decrease the gear ratio, an operation for calculating the lower limit guard value is executed to limit the target gear ratio based on the calculated lower limit guard value, and an operation for calculating the upper limit guard value is not executed.

6. The controller of a continuously variable transmission according to claim 4, further comprising
a determining unit that determines whether to decrease or increase the gear ratio, and
when the determining unit determines to increase the gear ratio, an operation for calculating the upper limit guard value is executed to limit the target gear ratio based on the calculated upper limit guard value, and an operation for calculating the lower limit guard value is not executed.

7. The controller of a continuously variable transmission according to claim 1, wherein the lower limit thrust is calculated based on torque transmitted by the belt, a winding radius of the belt at the primary pulley, a friction coefficient between the primary pulley and the belt, and a gradient of a portion of the primary pulley that contacts the belt.

8. The controller of a continuously variable transmission according to claim 1, wherein the upper limit thrust is calculated by multiplying the lower limit thrust by a coefficient that is greater than "1.0".

9. The controller of a continuously variable transmission according to claim 1, wherein
the primary pulley and the secondary pulley each include a hydraulic chamber, and
the thrusts of the pulleys are controlled by controlling hydraulic pressures of hydraulic oil supplied to each hydraulic chamber.

* * * * *